United States Patent
Gower et al.

(10) Patent No.: US 7,578,441 B2
(45) Date of Patent: Aug. 25, 2009

(54) DATA RETRIEVAL METHOD AND APPARATUS

(75) Inventors: Andrew P Gower, Ipswich (GB); Martin W Trimby, Saxmundham (GB); Jonathan S Sutton, Ipswich (GB)

(73) Assignee: British Telecommunications plc, London (GB)

( * ) Notice: Subject to any disclaimer, the term of this patent is extended or adjusted under 35 U.S.C. 154(b) by 416 days.

(21) Appl. No.: 10/540,256

(22) PCT Filed: Dec. 30, 2003

(86) PCT No.: PCT/GB03/05641
§ 371 (c)(1), (2), (4) Date: Jun. 22, 2005

(87) PCT Pub. No.: WO2004/059532
PCT Pub. Date: Jul. 15, 2004

(65) Prior Publication Data
US 2006/0074923 A1 Apr. 6, 2006

(30) Foreign Application Priority Data
Dec. 30, 2002 (GB) ................... 0230271.9

(51) Int. Cl.
*G06K 7/10* (2006.01)
(52) U.S. Cl. .................................... 235/454
(58) Field of Classification Search ........... 235/454
See application file for complete search history.

(56) References Cited

U.S. PATENT DOCUMENTS 6,424,738 B1 * 7/2002 Katsumura et al. .......... 382/165
2001/0040987 A1 * 11/2001 Bjorn et al. .................. 382/124

FOREIGN PATENT DOCUMENTS

| EP | 1043698 A2 | 10/2000 |
| EP | 1085431 A2 | 3/2001 |
| EP | 1209589 A2 | 5/2002 |
| GB | 2381605 A | 5/2003 |
| WO | WO 98/22888 | 5/1998 |

(Continued)

OTHER PUBLICATIONS

British Search Report.

(Continued)

*Primary Examiner*—Karl D Frech
*Assistant Examiner*—Tae W Kim
(74) *Attorney, Agent, or Firm*—Nixon & Vanderhye PC

(57) ABSTRACT

An association is created in a computer system between the appearance of a token and one or more stored files for the purpose of retrieving and presenting said one or more stored files. The appearance of the token is measured and a token identity is created from the obtained measurement. The token identity is stored in an identity store. The stored file is associated with the token identity within the computer system. The appearance of the token is subsequently measured and a subsequent identity is created for the token using subsequent measurement data obtained from the subsequent measurement. The identity store is searched for a match with the subsequent identity and upon the location of a match, the one or more stored files are retrieved and presented to a user.

18 Claims, 7 Drawing Sheets

FOREIGN PATENT DOCUMENTS

| | | |
|---|---|---|
| WO | WO 01/61448 A1 | 8/2001 |
| WO | WO 01/99410 A2 | 12/2001 |
| WO | WO 02/057959 A2 | 7/2002 |
| WO | WO 2004/059532 A3 | 7/2004 |

OTHER PUBLICATIONS

International Search Report.

Information about iPhoto, from Apple Inc.'s website, URL:http://www.apple.com/iphoto/ Dec. 23, 2002.

Object Recognition Research by Randal C. Nelson, URL:http://www.cs.rochester.edu/u/nelson/research/recognition/recognition.html , Aug. 20, 2002.

"Visual Object Recognition", by Charles Q. Little, URL:http://www.sandia.gov/isrc/VOR.html , Aug. 20, 2002.

* cited by examiner

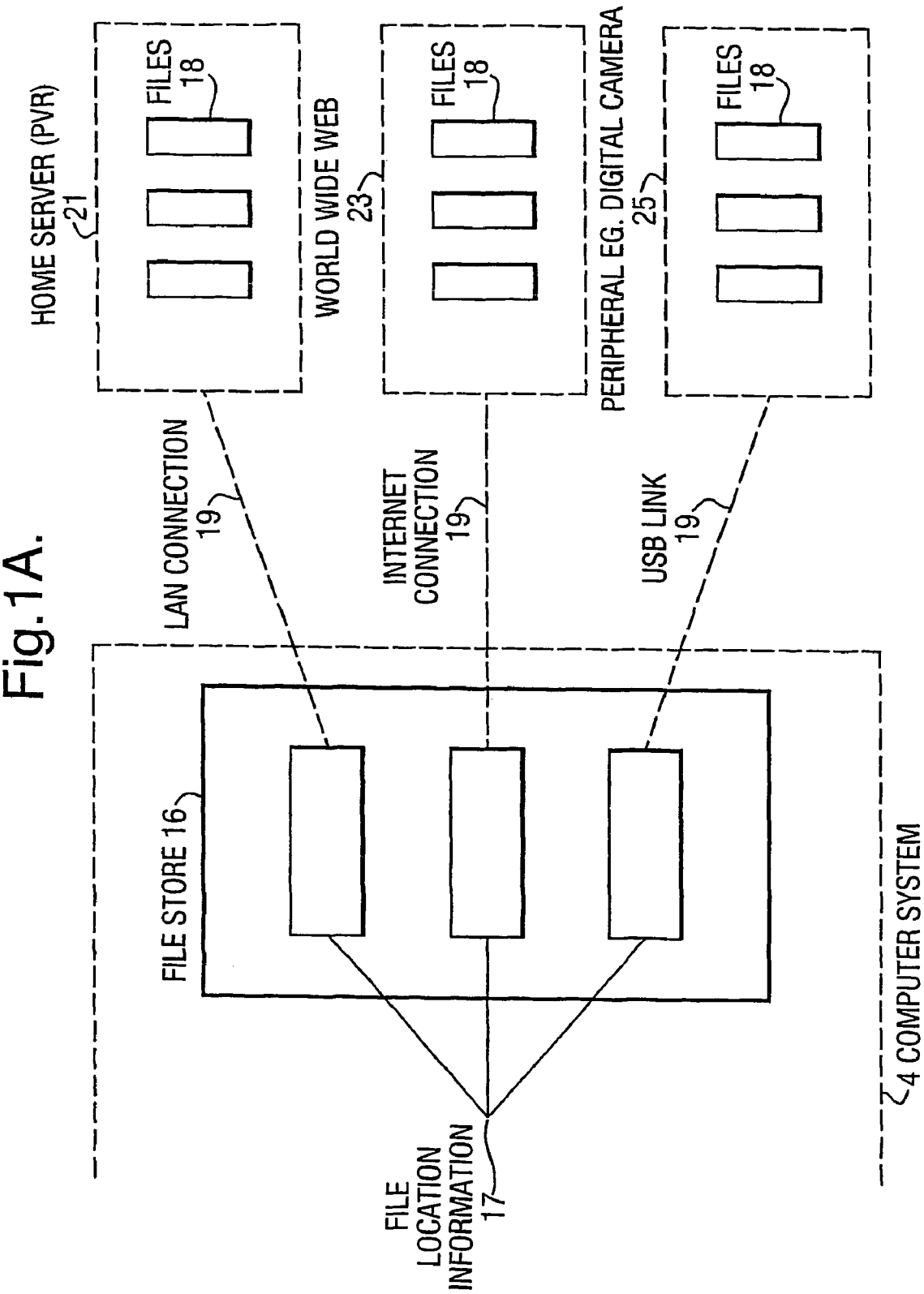

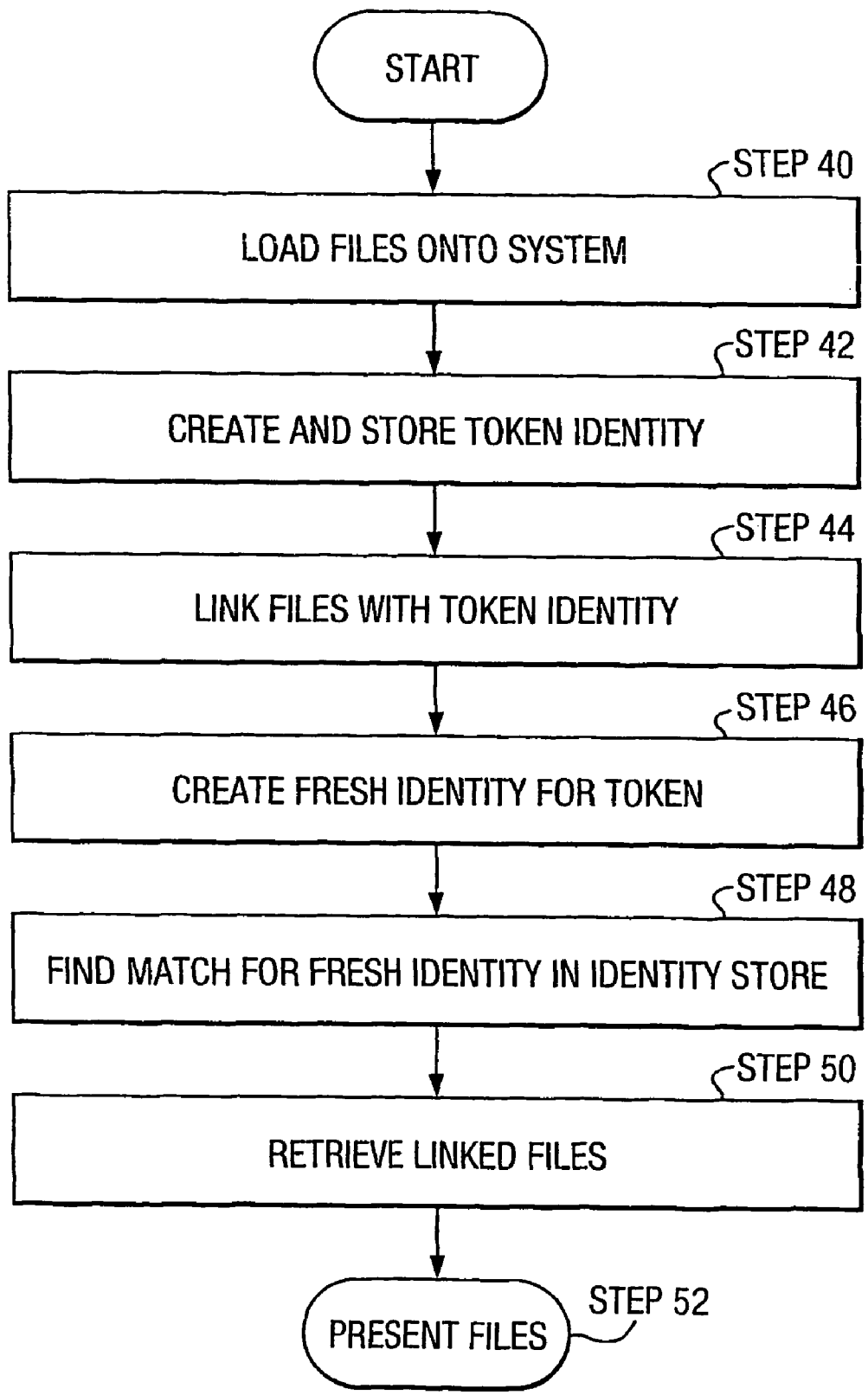

DATA RETRIEVAL METHOD AND APPARATUS

This application is the US national phase of international application PCT/GB2003/005641 filed 30 Dec. 2003 which designated the U.S. and claims benefit of GB 0230271.9, dated 30 Dec. 2002, the entire content of which is hereby incorporated by reference.

BACKGROUND

1. Technical Field

The present invention relates to a method and apparatus allowing a user to store and retrieve electronic data.

2. Related Art

It has long been known that human memory (or recollection) can be stimulated through smells, sounds and tangible mementos which are associated with an event or experience which is to be remembered. For this reason it has long been commonplace for people to buy souvenirs or mementos while on holiday and to keep a gift or a found object as a focus for their memories of an experience, event or special occasion. Subsequent exposure to the memento can effectively link memories of the event or occasion.

Of course it has long been common for people to take photographs at such events or occasions, as a means of "capturing" the event in a more tangible way than simply through memory. Those of an organised or careful disposition will create photo albums of selected images of the event, labelled and stored in a known location. Others will simply amass a large collection of sets of photographs, unsorted and unlabelled, the collection being distributed around the house. One of the assumed advantages of digital photography or digitally-stored photography is that it is easier to create an indexed archive of images, which can be quickly searched to retrieve any desired stored image. Although this is possible, the reality is that it is easier in a conventional computer system to lose stored images simply because they are not stored in the expected place.

Currently, it is conventional for a user to call up electronic files such as digital photographs—other types of files such as those of video clips, sound recordings, websites, email, SMS messages and the like—on a computer system by using software commands—in a typical Microsoft Windows™ set-up for instance, files can be retrieved using Windows Explorer™ software. Alternatively the user could search for a file using keywords. A user could therefore retrieve the electronic files associated with his holiday by going to an exact location on his computer system or by searching with, it will be hoped, the appropriate and correct keywords associated with the said files.

There are a variety of methods to retrieve electronic files, but they will generally require the user to have some knowledge of what he is looking for. If he has forgotten the location—or the existence—of a particular electronic file, that file could be "lost" within the computer system. This problem is made worse in computer systems comprising separate devices but which are linked for example by a network such as a Local Area Network, or the Internet. The process of recalling and retrieval therefore depends greatly on the user's recollection and knowledge of his computer system, and human memory typically deteriorates with time. Furthermore, computer files are easily, and often are, moved even within a single computer system set up. In addition to problems of accuracy, using electronic search parameters to describe an event is seldom intuitive, for the reasons discussed above.

It would therefore be advantageous to be able to locate, organise and retrieve electronic files associated with a certain event, in an intuitive manner, such as by the computer system's recognition of a physical token with which the electronic files have been linked.

One known approach to facilitating the location and retrieval of stored data is described in a white paper titled "The Memory Box" by Frolich et. al. of the Hewlett Packard Printing Imaging Technologies Laboratory dated 9 Aug. 2000. This approach involves the application of radio frequency identification (RFID) tags to mementoes or tokens. A user stores related data, for example, digital photographs, scanned documents, emails, sound files in a directory or directories in a computer system, and uses an RFID as a "key" whose identity is captured when the data is stored (or when they are associated together) if some or all are already stored. The memento or token should be something which the user will readily associate with the event to which the data relates. The apparatus recognises and responds to the information contained in the RFID tags. Such current examples of tagging technologies may not however be suitable for some applications. The addition of an RFID tag to certain objects may detract from their aesthetic appearance, for example in the case of jewellery. There are also the practical difficulties in tagging objects with complex shapes or surface textures, the possibility of tags becoming dislodged from the object, and the expense involved in creating or purchasing tags for each physical token.

SUMMARY

In the current exemplary embodiment, problems associated with separate identification techniques are overcome as the method and apparatus involves the recognition of a physical token from its inherent physical parameters, without the need to separately label the token with RFID tags, barcodes or the like.

In accordance with a first aspect, the invention provides a method to create within a computer system, an association between the appearance of a token and one or more stored files, comprising the steps of:

measuring said appearance of said token;
creating a token identity from the obtained measurement;
storing said electronic identity in an identity store; and
associating said one or more stored files with said token identity.

This aspect of the invention allows the user to link certain electronic files to the identity of a physical token, created by reference to the token's appearance.

In accordance with a second aspect of the invention, there is provided a method to create within a computer system, an association between the appearance of a token and information of the location of one or more files, comprising the steps of:

measuring said appearance of said token;
creating a token identity from the obtained measurement; and
storing said electronic identity in an identity store; and
associating said token identity with said information of the location of one or more files.

This aspect of the invention allow the user to link the token identity not to the electronic files themselves, but to information about the location of such files. This aspect is especially relevant where a user's files are kept in a number of different locations on one computer system, or where the files are located remotely from the computer system within a network.

According to a third aspect of the invention, there is provided a method to retrieve one or more stored files within a computer system, by use of a stored token identity created from measuring the appearance of a token, where said token identity is associated with said one or more stored files, comprising the steps of:

creating a subsequent identity for said token by measuring said appearance again;

searching for a match for said subsequent identity with said token identity; and upon the location of a match, retrieving said one or more stored files which are associated with said stored token identity.

In this third aspect of the invention, files already associated with an already existing token identity allow the user to immediately proceed to the step of retrieving the electronic files associated with the identity.

According to a further aspect of the invention, there is provided a method to create within a computer system, an association between the appearance of a token and one or more stored files for the purpose of retrieving and presenting said one or more stored files, comprising the steps of:

measuring said appearance of said token;

creating a token identity from the obtained measurement;

storing said token identity in an identity store;

associating within said computer system, said stored file with said token identity;

subsequently measuring said appearance of said token;

creating a subsequent identity for said token using subsequent measurement data obtained from said subsequent measurement;

searching in said identity store for a match with said subsequent identity;

upon the location of a match, retrieving said one or more stored files; and presenting said retrieved file to a user.

This aspect of the invention allows a user to create an association between the appearance of a physical token and electronic files, so that he can retrieve the files associated with the token identity he has created.

Further aspects of the invention described below provide apparatus to carry out the invention.

BRIEF DESCRIPTION OF THE DRAWINGS

Systems, methods and apparatus embodying the present invention will now be described by way of example only, with reference to the following drawings, wherein:

FIG. 1A is an alternative schematic representation of the file store of FIG. 1;

FIG. 3 is a flow diagram giving an overview of a method of organising and retrieving electronic files by reference to the physical parameters of a physical token;

DETAILED DESCRIPTION OF EXEMPLARY EMBODIMENTS

Figure 1:
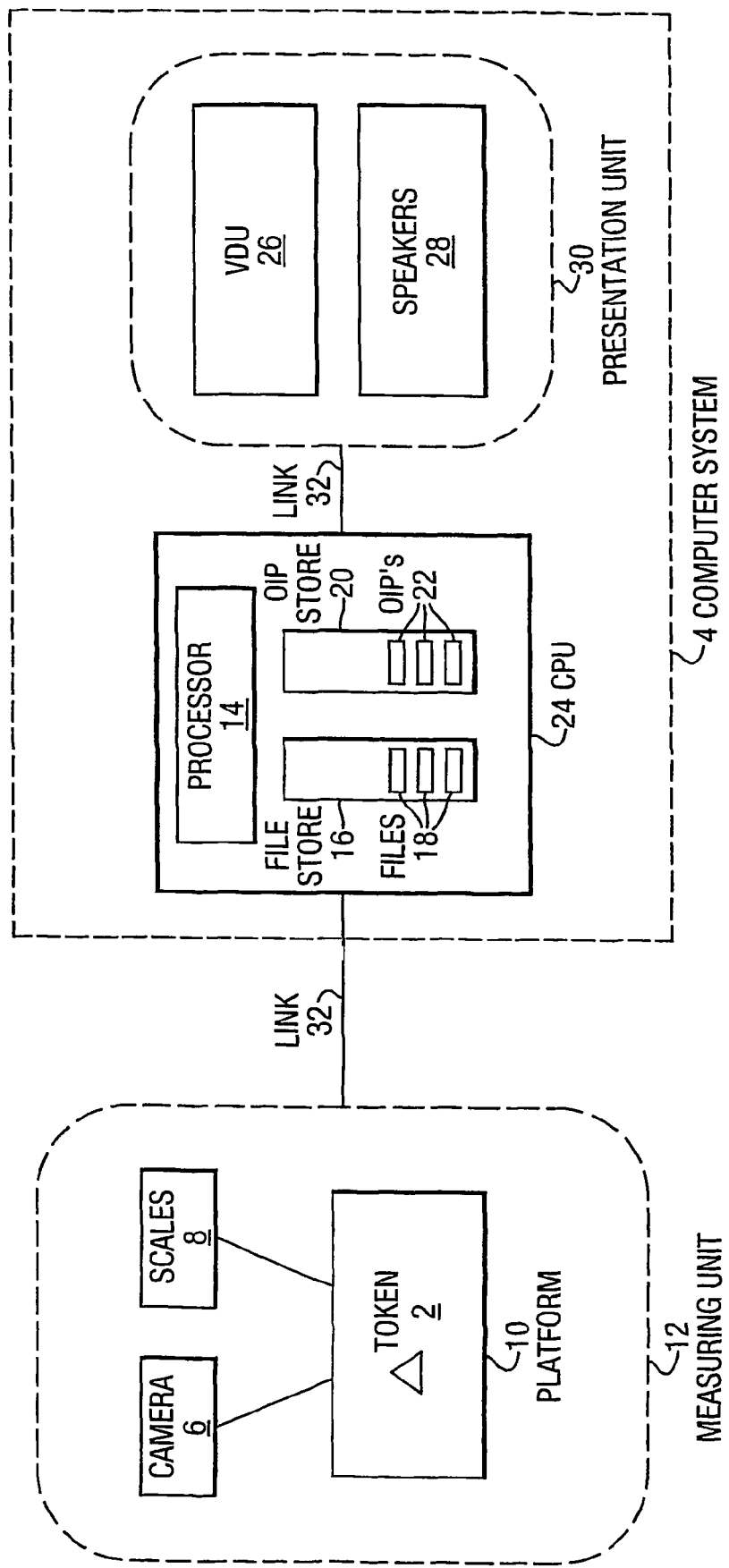
FIG. 1 is a schematic drawing of giving an overview of an embodiment of the invention, being a system incorporating the invention comprising a measurement unit, processing and storage units, and a presentation unit.

FIG. 1 is a generalised drawing showing the system and apparatus for carrying out an embodiment of the invention. In a typical scenario, a user has electronic files such as digital photographs taken during a holiday, for example. He also has a souvenir or token (2) from the same holiday, such as a seashell. The seashell will be given an electronic identity so that within the user's computer system (4), a representation of the physical characteristics of the seashell will serve as the link between the actual physical seashell and the user's stored digital photograph files. It is a key feature of the invention that no separate labelling or other identification of the token is necessary to create the electronic identity, as the token's inherent physical characteristics serve as the reference for this purpose.

While the current embodiments discussed here concern the measurement of the characteristics of three-dimensional physical objects having substantial dimensions in three orthogonal directions, it is envisaged that the invention may be applied to thin three-dimensional objects sometimes referred to as two-dimensional objects such as business cards, theatre tickets, postcards etc. can be used. The invention would not generally require additional recognition software such as Optical Character Recognition (OCR) or picture/image recognition software as the premise of the system is not to recognize specific elements of the object but to build a unique signature for that object based on a variety of abstract measurements which are consistent and repeatable.

To begin, the user uploads his digital photograph files (18) onto the computer system, if the files are not already stored on the system. Alternatively, phone-based camera systems may automatically upload images onto a remote server. Also, systems based on Microsoft Windows™ can be set up to automatically transfer files from a camera or other USB connected data store directly to the PCs hard drive. The files may be loaded at this or any later stage before the user links them to the token identity (please see below). Typically, the files are stored in a file store or memory (16) within the system. More generally, the file store may be a list of path names (17) to link the relevant files (18), which may be scattered across different platforms and locations but connected or linked (19) such as a local PCs, remote web servers, peripherals (25) etc. This alternative method of linking the files is shown in FIG. 1A.

The user then creates an electronic identity for the token in the following manner. He places the token in or on a measuring unit (12), which in the present embodiment comprises a platform (10), a camera (6) and weighing scales (8). The unit then measures one or more physical characteristics of the token, for example the size, shape, colour and/or weight of the seashell. The measurement data obtained is then sent to the processing unit (14) to generate an electronic identity (22), which could be a simple direct reference to one measurement parameter, e.g. the size of the token. More preferably, the identity could be a more complex object identification profile (OIP) of a combination of the token's size, shape, colour and/or weight. The advantage of creating an OIP is improved accuracy in recognising the token when it is next introduced to the system.

The token identity or OIP (22) is then stored in a token identity store (20). In a preferred arrangement, the token identity store in particular, takes an open and device-independent form, which would enable other devices and systems to have access to and use of the stored data. A number and variety of different users and/or apparatus could therefore be involved in the various steps of the invention as described herein.

Given the ease and frequency with which electronic files move, even within a single computer system, the processing unit (14) in a preferred embodiment monitors the location of linked electronic files for changes. Upon a change, the corresponding information about the location of the linked file is updated in the service metadata store. Alternatively, the user may choose to manually update links, or to override the updates made by the processing unit.

To further enhance the functionality of the invention, the processing unit may be arranged so that it is able to record "context information" when the electronic files are created—for example a certain type of files (such as digital photographs) created during a certain period could form the basis of such context information. Additionally or alternatively, context information may comprise geographic location, author, type of capture device used, file type, date created, etc. This could be implemented in various ways, including through use of cellular communication network location systems, or Global Positioning Systems. With such context information, the user need not rely on his memory alone to locate all the relevant files to link with the OIP, he need simply to specify the relevant search parameters. It should be noted that context recording may be a feature of the camera or middleware associated with an on-line phone camera service. In such a case it would be useful if the context information could be utilised in systems according to the invention.

As a next step, the user links the token identity or OIP with the files (18) stored in the electronic file store (16) (which may be a local computer hard drive, a remote networked server, etc.). This is achieved by the user entering software commands to instruct the processing unit (14) to create the necessary links.

When he wishes to retrieve the electronic files (18) linked to the token identity, the user repeats the process described above to measure and create a fresh identity for the token. The token should preferably be measured in a manner identical to how it was previously measured. For example if the token identity is based only on its weight, then the fresh token identity must include weight measurements, although it could include measurement data of other physical characteristics of the token e.g. its colour, shape, etc. The processing unit (14) then uses the freshly created identity to search for a match in the token identity store (22). Upon finding a match with a token identity, the electronic file(s) (16) linked thereto are identified. They can then be retrieved by the processing unit to be presented to the user via the presentation unit (30).

If the file(s) (18) are graphic files such as digital photographs or digital video, they can be presented on the video display unit (26) of the presentation unit (30), and where there is more than one photograph they could be played back in a sequence. If the linked files (18) are sound files they can be played back in a system appropriately set up with sound cards or the like and speakers (28).

Preferably, the processing unit (14) is arranged so that it can recall when a presentation of a particular set of electronic files was made. With this feature, the processing unit will be able to identify if a break in the presentation is merely temporary so that, when prompted, it continues the presentation at the point it last stopped at, and/or if it should begin the entire sequence afresh. This is achieved by referring to the duration of the stop, or the time elapsed since the presentation was stopped.

It will be apparent that the presentation unit could comprise or include apparatus capable of presenting or playing back other kinds of electronic files of data, including those relating to three-dimension data, smells, taste, touch and so on.

In the present embodiment shown in FIG. 1, the units, particularly the measuring unit is shown to be physically separate from each other but connected (32) by physical or virtual links. In alternative embodiments, the invention could comprise apparatus incorporating two or all three of the units.

Figure 2:
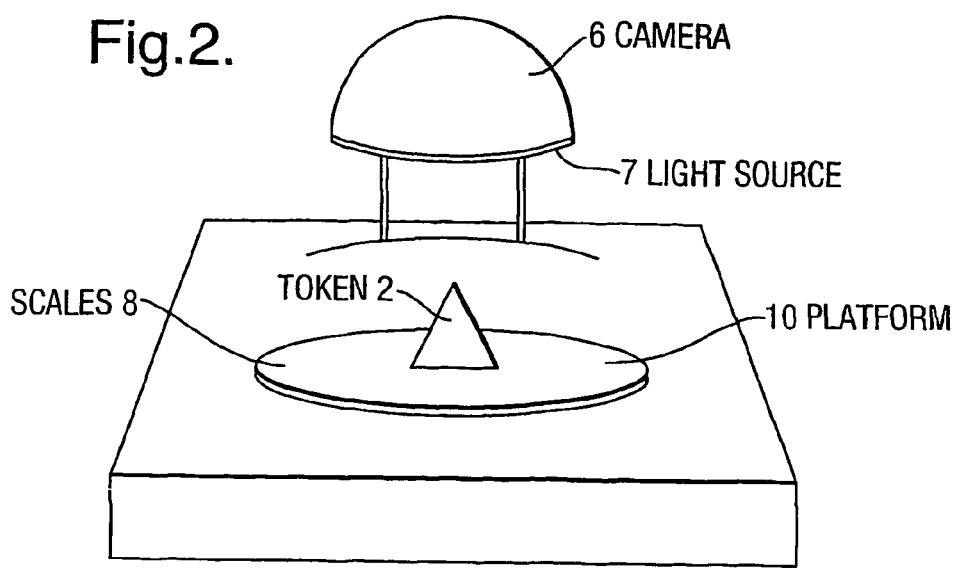
FIG. 2 is a schematic representation of the measuring unit of FIG. 1.

FIG. 2 shows the measuring unit of FIG. 1 in greater detail. In the present embodiment, this unit comprises a camera (6) and digital weighing scales (8) in the configuration shown.

The measuring apparatus are arranged so that measurements can be taken in a predefined, controlled and repeatable manner, to ensure consistency in the creation of token identities.

The user places the token (2) upon the platform (10) for measurement. The platform is located so that the camera lens is directed to the token; the platform also serves also as the weighing platform for the scales. The colour, texture and other physical properties of the platform are preferably such as to assist in the measurement process, for example in the current embodiment it is a mid-grey tone to maximise the ease of measuring ambient light levels prior to creating a token identity.

The scales used in this embodiment are finely calibrated and capable of detecting changes to an accuracy of 0.1 grams. Although the current embodiment of the invention is arranged to receive pocket-sized tokens typically weighing tens to several hundreds of grams, it will be appreciated that the concept of the invention allows for physical objects of any size to serve as tokens, so it is envisaged that suitable weighing or other measuring apparatus will be provided.

In the present embodiment, the camera measures the token for size, shape and colour. Colour is read by the camera by determining the individual chroma values (red green and blue) of the token by measuring the luminance value of each primary colour between a value of 0 and 255. This is done across a designated matrix of points over the entire scanning area. Reading accuracy can be enhanced by increasing the density of the pixel matrix. Size, or area is measured by calculating the luminance of the token across a matrix of points, over the entire scanning area. If the luminance of a pixel changes from a control reference value, it is assumed that the token is visible at that point. For example if the platform area is 100 $cm^2$ and 73% of the pixels measured within the matrix change, a value of 73 $cm^2$ will be recorded as being the token's area in its OIP.

The camera and scales are arranged so that the token's size, colour and shape can be captured simultaneously with its weight. It would however be clear that the camera and scales, or any measuring unit within the arrangement, need not necessarily have to be placed so that readings of various different physical characteristics be made at the same time nor at the same place. For example the token could be moved between separate measuring devices in order to obtain the required readings to generate the token's OIP. It would also be apparent to the skilled person that the camera in particular, can be placed in any configuration within the set up, or even be arranged to capture a three-dimensional view of the token e.g. by moving the camera relative to the token.

Preferably, the measuring unit could be arranged to generate control reference values for each measurement format (e.g. weight, chroma values, etc.), typically before the token is measured. The values could be recorded continuously or just prior to measurement, and they would act as a dynamic baseline value for each measurement. By using control reference values, external factors affecting the reading such as changes in ambient lighting, can be taken into account. Alternatively the control value could be manually re-set after each measurement is taken. This feature can be set to operate automatically, or the user can choose to override any settings made.

Figure 2A:
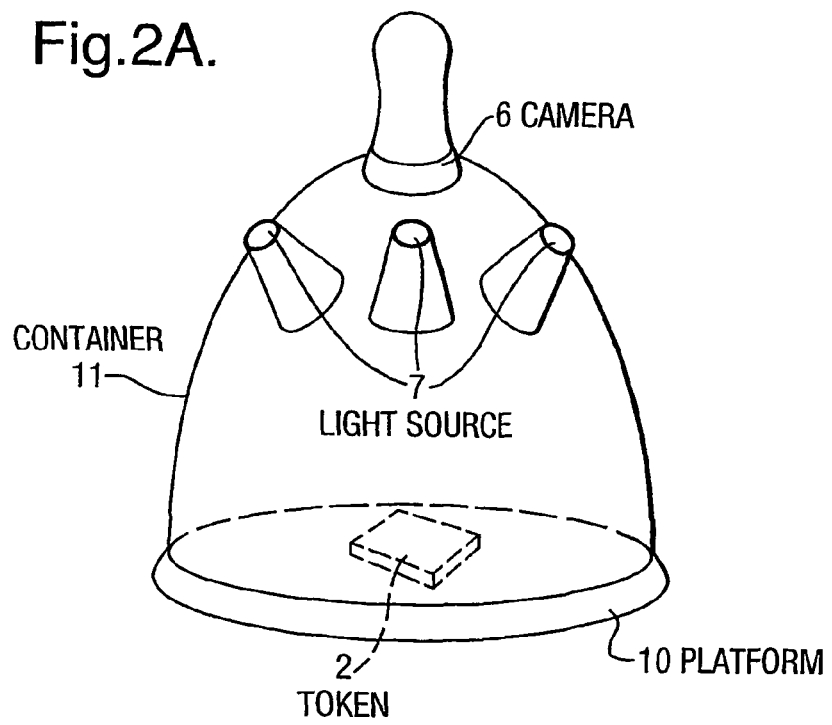
FIG. 2A is an alternative schematic representation of the measuring unit of FIG. 1.

In a preferred embodiment, there are means to control the measurement environment. For example, a light (7) can be provided so that the camera readings rely less on the level, type and so on, of ambient lighting. Another way to control ambient lighting would be to exclude it completely by placing the token within a light-fast container (11) within which is provided a dedicated light source. An embodiment including only a camera (i.e. no weighing scales) in a light-fast container is shown in FIG. 2A.

Figure 2B:
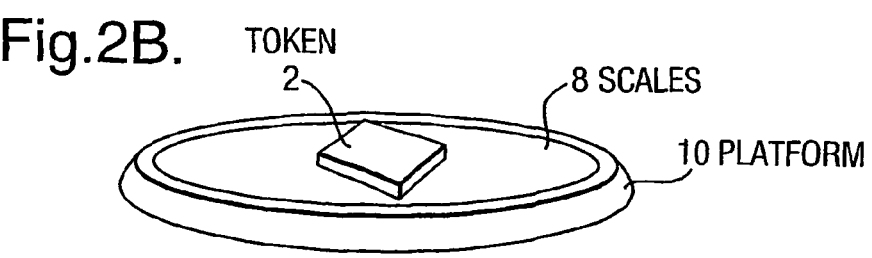
FIG. 2B is another alternative schematic representation of the measuring unit of FIG. 1.

A configuration of the invention including only weighing scales and no camera is shown in FIG. 2B.

FIG. 3 describes the process in the form of a flowchart, which gives an overview of the steps involved. Typically, the first step (step 40) is to store electronic files (18) (such as digital photographs) in the file store (16). Next, (step 42) an identity for the token (22) is created through the measurement of the token's physical characteristics, which is stored in the token identity store (20). The user then (step 44) selects and the links the electronic files (18) to the token identity (22).

When the user next wants to access the linked electronic files, he creates a fresh identity for the same token or one similar to it (step 46). With the fresh identity, a search for a match is made (step 48) for the identity stored in the system, and upon location of a match, the files linked thereto are retrieved (step 50). The files are then presented to the user (step 52).

The steps in this process are now described in more detail in connection with FIGS. 4, 5 and 6 as follows.

Figure 4:
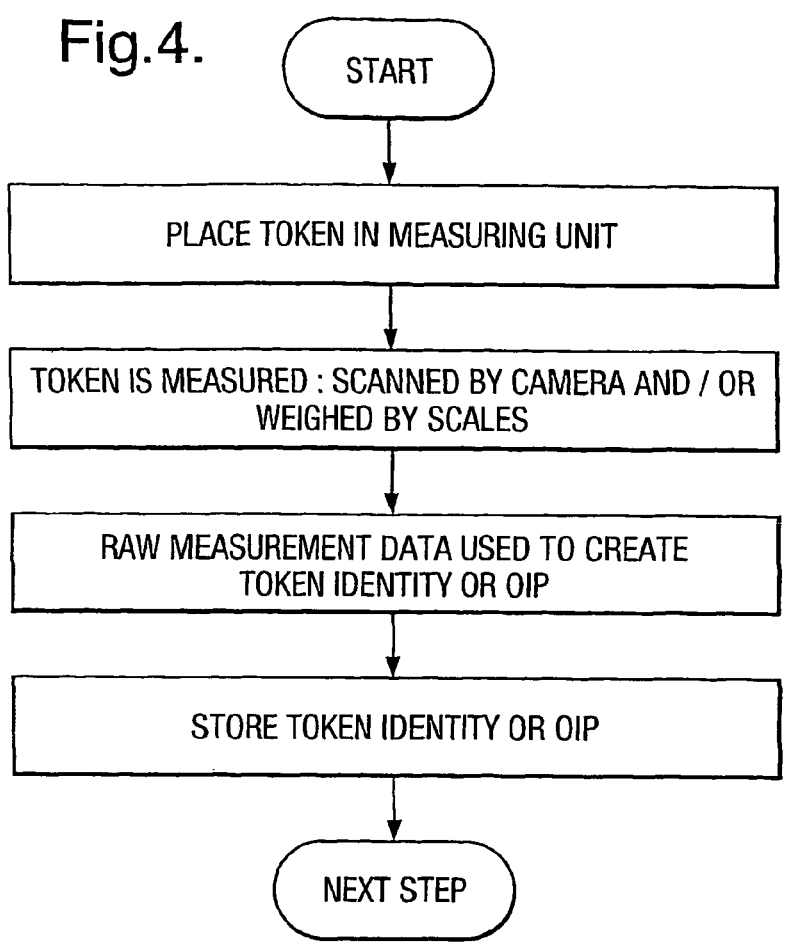
FIG. 4 is a flow diagram of the process of creating a token identity of FIG. 3, in greater detail.

FIG. 4 shows the step of creating an identity for a token (step 42) in greater detail. The purpose of this step is to create within the computer system a reference to which electronic files can be linked to.

In this step, one or more selected physical characteristics of the token (2) are measured. This could be any measurable physical characteristic of the token, including its volume, density, material composition, radioactivity level, and so on. For current purposes however, this discussion shall be limited to the size, shape, colour and/or weight of the token, which can be measured with a camera (6) and weighing scales (8). The token is scanned by the camera and weighed by the scales, and the captured measurement data used to form the basis for the token's identity.

The physical characteristic of the token can be measured just once, or a number of times and the resulting data averaged out to obtain a more accurate reading. For example, changes in the ambient lighting around the token in a set up including a camera, may result in inconsistent readings. As described above, it is preferable to create an identity from multiple measurement date to create a composite profile of the token or an object identification profile (OIP). An OIP is likely to be a more accurate identifier of the measured token, distinguishing it from other tokens with similar features e.g. by size only, or weight only. This aspect of the invention is especially significant in enabling the accurate recognition of the OIP when the token is next used.

In the creation of an accurate OIP, it is preferable for the measurement of each physical characteristic to be prioritised so that each has a measurement accuracy value (MAV). A MAV allows the user to choose which, of the various physical characteristics measured, to rely more upon. For example, the weight of a token may be found to be less susceptible to change than colour, which can alter through changed ambient lighting conditions, or when it fades through time. The weight of the token may then be given a MAV of 10, while that for a colour reading may be only 5. When the apparatus is subsequently required to choose between a match in weight and another in colour, it will prefer the match in weight due to the higher MAV given to weight. A MAV is also a gauge of how accurate a reading will be based on the capabilities of the measuring device. For example some configurations will be capable of more accurately measuring colour depending on whether ambient light is completely excluded or artificially compensated for.

In an embodiment of the invention, the user can manually set or re-set the MAVs to compensate for the use of different measuring devices, or the same devices(s) at different times. Preferably however, the MAV are automatically set by referencing MAV information held within the measuring device. MAVs are specific to the particular measurement device, and is typically stored as part of the OIP.

To further facilitate the accurate recognition of the token when it is next used, information about the configuration and specification of the measuring device(s), and the measurement environment (such as ambient lighting levels) could be recorded. These readings could also be stored as part of the OIP. They would allow the user to compensate for any differences in the measurement environment that may affect the later measurement of the token.

After creation, the user may change or override any aspect of the OIP before it is stored. It is also possible for the user to create a number of OIPs to serve as the identifier for a token. For example, a second or subsequent OIP for a token placed in a different configuration e.g. in an upside-down position, could help to later recall the correct linked files.

A tangible representation of the OIP may then be generated which will take a form easily understood by users. This could take the form of, for example, a photograph of the token itself referenced via a recorded URL. This is to allow the user to use the OIP for linking and other purposes.

Once the token identity has been successfully created, it is stored in a token identity store (20). At this stage, the user is typically prompted to link electronic files (step 44), in the manner described as follows in connection with FIG. 5.

Figure 5:
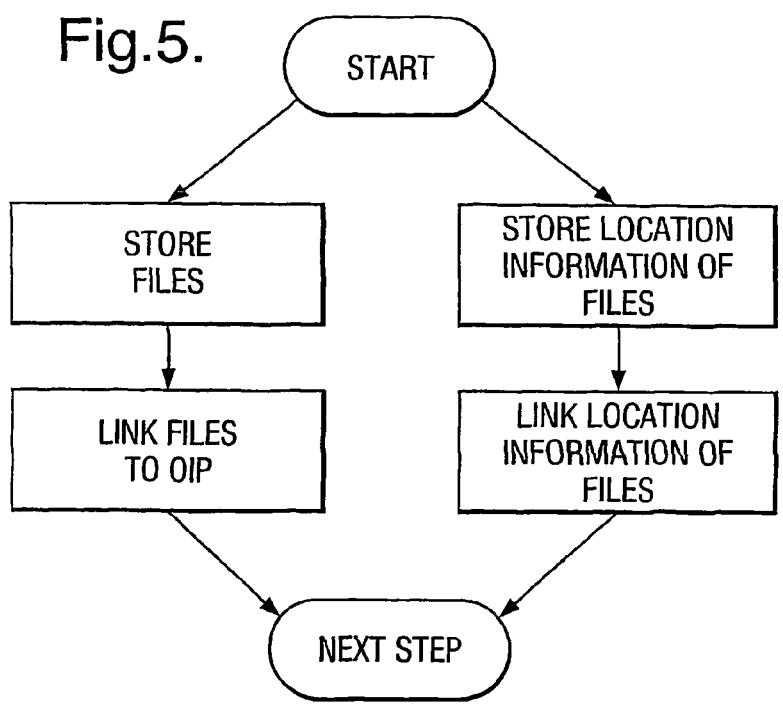
FIG. 5 is a flow diagram of the process of searching for a match for the fresh identity in the token identity store of FIG. 3, in greater detail.

FIG. 5 shows how a user links electronic files (18) with the OIP (22). Typically, files are already stored in the computer system; alternatively the user may choose to upload and store such files after creating an OIP, but prior to linking them. In the current arrangement, the user designates which electronic files he wishes to link to the OIP with appropriate software commands.

In a basic arrangement, electronic files of digital photographs, sound files etc. are already stored at one location within the set up, typically in the file store (16). However, it is rare that all the files to be linked are located in one area, given the ease with which electronic files can be moved within a computer system between disk drives and to and from peripherals. As one of the purposes of this invention is to allow a user to organise his electronic files which might otherwise be lost or forgotten, an alternative arrangement of the invention provides that files in disparate locations may be linked to the OIP.

In this arrangement, the user does not link the OIP to the electronic files themselves, but links the OIP to information about the location of the electronic files (17) such as in the form of file paths. This information can be stored in the file store (16) or some other location within the system. In a preferred embodiment, there is provided linked file monitoring software to automatically update the location of a file when a user moves it, which is referenced in the file store.

A wider application of this feature allows OIPs to be linked to electronic files located remotely from the user's computer system, but which is connected through a network such as a Local Area Network or the Internet.

To simplify the linking process for the user, intelligent search machines can be included in the arrangement. For example, the user could automatically link date-stamped electronic files by specifying a time period and/or media type.

Figure 6:
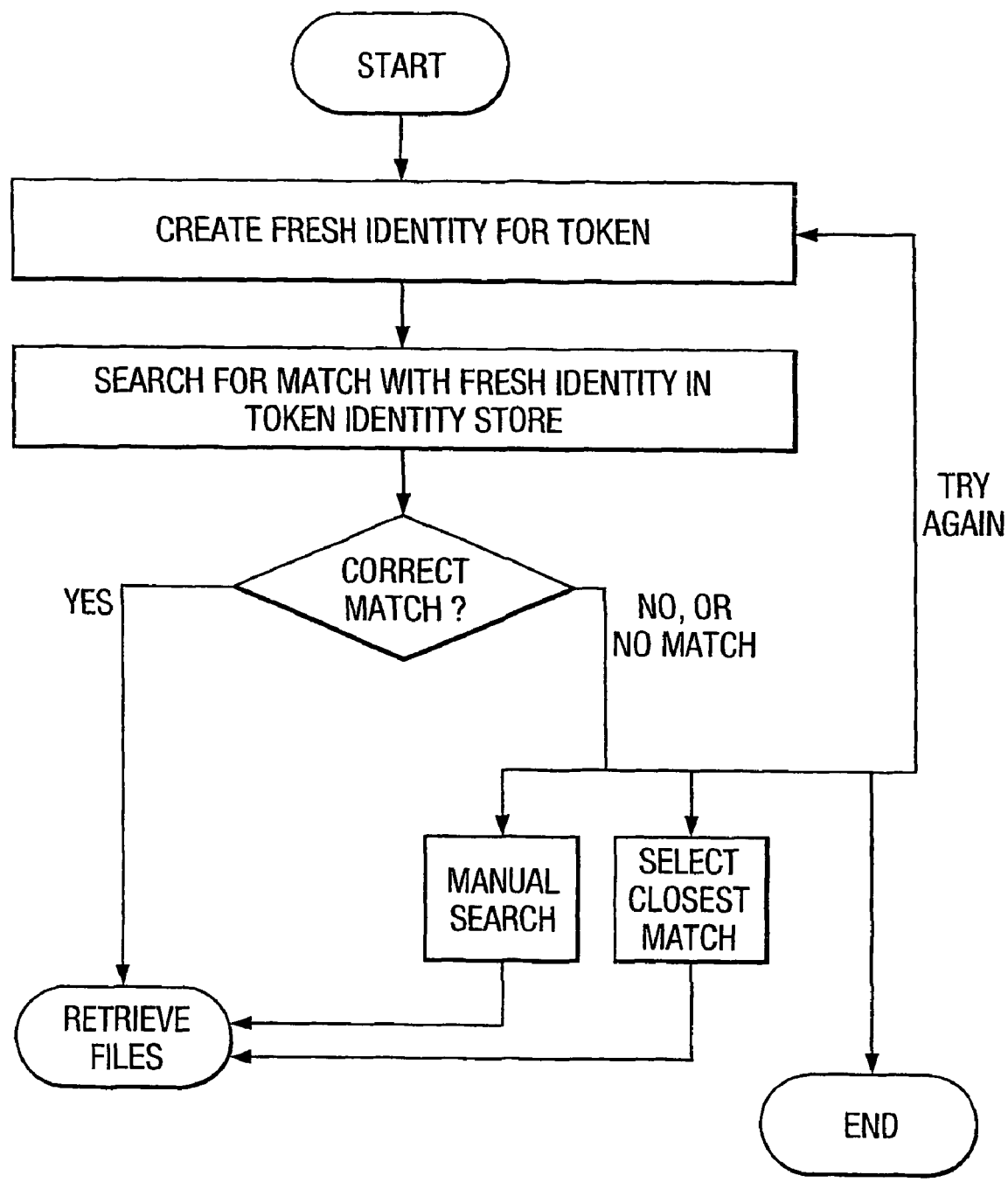
FIG. 6 is a flow diagram of the process of linking electronic files to the token identity of FIG. 3, in greater detail.

FIG. 6 shows how electronic files linked with OIPs can be retrieved (steps 46, 48 and 50).

When the user wishes to retrieve the files linked to the token, he generates a fresh identity for the token by having it measured by the measuring unit (12) in the same way as described in step 42. After the creation of the fresh identity or OIP, a search is conducted in the OIP store (20) for a match against the fresh OIP. If a match is found, the system is deemed to have recognised the token.

If no match is found, the user can, in the present embodiment, choose to select the next closest identity(s) or OIP(s). He could also seek to override the automated search and match processes and manually search for a match. In the event that a match is found but is the wrong OIP, the user can also perform a manual search for the correct OIP.

Upon finding the correct matching OIP, the user may choose to have the linked electronic files retrieved; alternatively the apparatus can be set up to automatically retrieve the linked files upon the finding of a match (step 50). The display or playback system is typically software using the file location information or file path (17) to locate, retrieve and present the file. This could entail temporary copying and download of the file to a local area (cache) and after display or a predefined period of time automatically deleted.

The embodiments described herein are principally concerned with the retrieval of files based on the recognition of a physical object. However, alternative or conditional actions could be performed, automatically or otherwise, once the token has been recognised. These could include starting up a specific software application (for example, PC-based applications such as Microsoft Word™, logging onto a secure and personalised computer system, the opening of an internet browser window and automatic direction to a website, the starting of Microsoft MediaPlayer™ and/or the opening of an MP3audio file for automatic playback or similarly the opening up of a preaddressed email within Microsoft Outlook™).

After retrieval, the linked files can be presented to the user (step 52). Where more than one electronic file is presented, the user may select all or part of the linked files to be presented or played back to him in any order he chooses. This is particularly relevant for graphic files such as digital photographs which could be presented as a slide show or a short film.

A feature of the current embodiment is the presentation of linked files accompanied and synchronised to music appropriate to chosen themes. A theme is determined by an analysis of the volume level and speed (in beats per minute) of the musical track, and content display rate of the presentation synchronised to the music.

Figure 7:
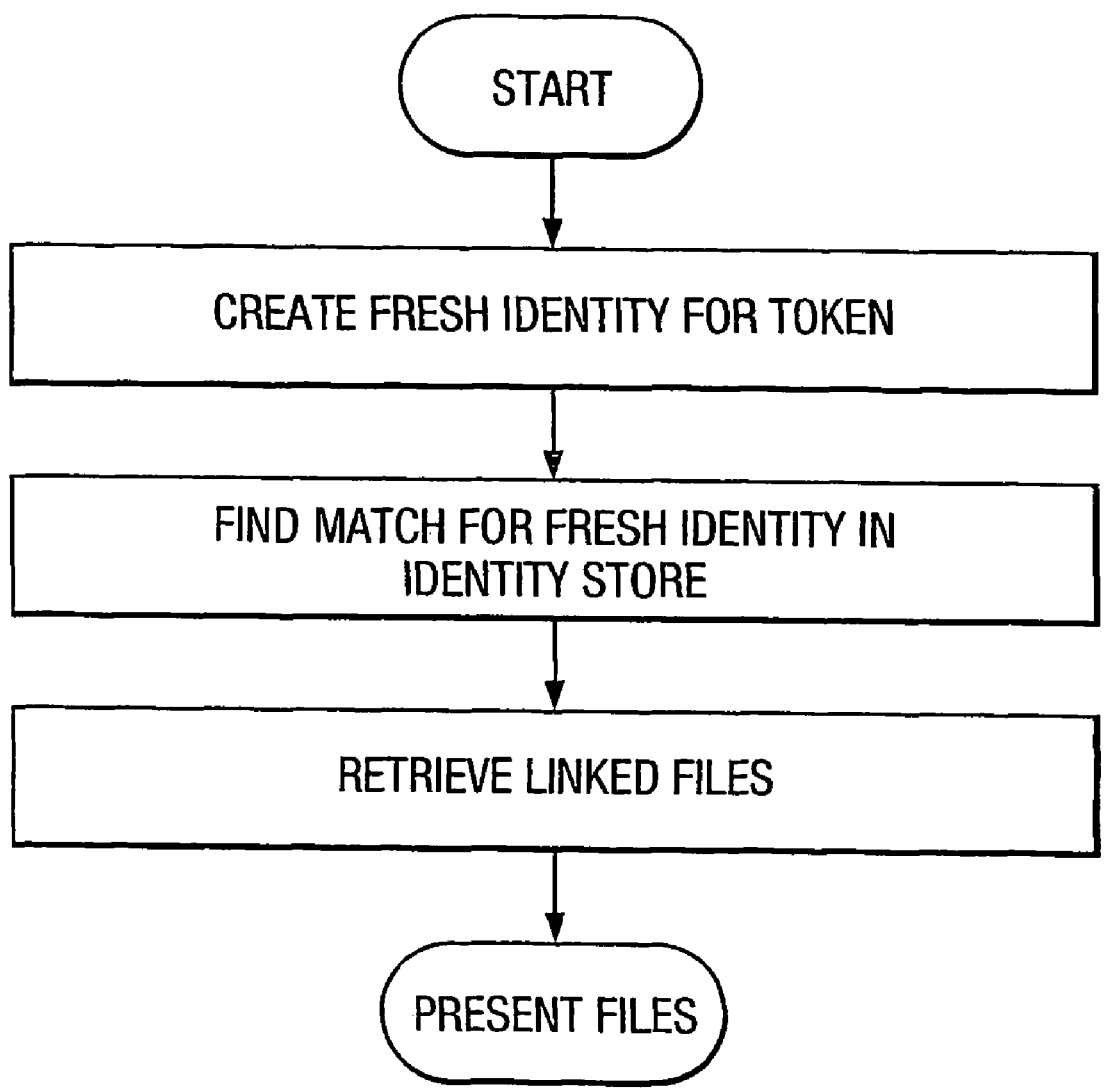
FIG. 7 is a flow diagram for a method of retrieving electronic files by reference to the physical parameters of a physical token, where token identity data has been pre-identified and -stored.

FIGS. 7 shows an alternative method of retrieving electronic files according to the method described in connection with FIG. 2. It is foreseen that the initial step of measuring a token to generate an OIP may not be required. One application of this process could take place in the context where several friends have identical or similar tokens from participating in the same event. One friend could create an OIP for the token and email it to the rest, so that the user may immediately link their files to the OIP. This application of the invention may also be used in the case of mass-produced items where commercial entities may provide pre-recorded OIPs with the physical token, saving the user the need to create an OIP himself.

In a further scenario the relevant electronic files may already be pre-linked to a pre-created OIP. The user thus can proceed straight to retrieving the linked files using the token as described above in connection with FIG. 6. An example of this embodiment of the invention could involve a user being given a token to gain access to electronic files linked to the OIP provided by a commercial entity. A traditional photo development shop could scan and upload 35 mm photographic prints for their customers onto a server, allowing the customers to view and download them from the Internet, with the aid of a souvenir from that holiday.

In yet another scenario, electronic files could be identified and dynamically retrieving by reference to more than one token. In this embodiment, multiple tokens act as the key to search and to retrieve electronic files having connections to all the tokens used. For example, three physical tokens (e.g. a seashell, a pipe and a train ticket to Brighton) could be identified by the system, and files related to all three (e.g. those related to Grandad's trip to Brighton beach) could be retrieved and presented to the user. Metadata is used to identify the electronic identities or OIPs of the tokens, as well as the electronic files. The metadata (being keyword descriptions describing e.g. "who", "what", "when", "where", "how" and "why" in connection with the token(s) or electronic files) is stored within the system. The metadata can be created automatically or by manual input.

Specifically, electronic file metadata could include information about the parties featured in the files, who generated the files, on what occasion was the file was created (a wedding, a birthday, etc.), when and where was the file created, why the participant was present at the occasion, etc. This information may be captured in a number of ways. The date, location and creator can be automatically generated through datestamping and the like, while other information such as who is shown in the media could be ascertained though analysis of associated voice or by text annotation.

Token, token identity or OIP metadata could include: who bought or procured the object, who gave the object and who received it, on what occasion was the object given/received (holiday, Christmas, etc.).

In this embodiment, the system seeks to find out both the number of tokens and the identity of the tokens placed on the platform (10). The following steps represent the process through which the system goes to do so:

1. Create a token identity or an OIP by measuring physical characteristics of a token (2).
2. Ascertain the number of tokens present. While it is desirable to do so, this is however not crucial to the correct identification of the tokens. Determining the number of tokens on the platform (10) can be achieved via an analysis of the image captured by the camera (6). Edge detection algorithms (which identify the edge of the object by comparing the chroma values of adjacent pixels, using the known background colour as a constant) can be used to identify the profile outlines of individual tokens. The number of profile shapes generated can then be used to help identify the tokens present on the platform.
3. Compare the token identity or OIP obtained in step 1 above, against all OIP entries within the OIP store (20). The system searches for matches of the stored measurement values of physical characteristics such as weight, chroma, area, etc.

$$\text{Total measured value} = \frac{\text{Sum of selected } OIP \text{ values in } OIP \text{ store}}{\text{Number of objects present}}$$

Once a match for one value (e.g. weight) has been established, the remaining measurement values (chroma, area, shape, etc) are compared for a match to confirm that the correct token(s) have been identified.

4. If more than one OIP is identified as a match, a Measurement Accuracy Value (MAV) is generated for each match to identify the closest OIP match.

5. Once the tokens have been identified, a "playlist" is created from the file store (16) of the electronic files (18) associated with all the tokens. The playlist can take a variety of forms, including:
   (a) A pre-defined playlist which wherein the files (18) associated with the tokens are presented to the user, who then selects them manually for inclusion in the playlist. In this embodiment, the user can also select the order in which the files are played back during step 52. Alternatively the files can be included and the order of playback generated automatically during the creation of the OIP. These pre-defined playlists are stored in the OIP store.
   (b) Another presentation option (step 52) would be to create a playlist which is dynamically created each time the OIPs are generated and matched. In order for this option to be realised both the OIP and electronic files require key word metadata to be added to the OIP store. Typically this metadata will provide information under the headings of "who", "what", "when", "where", "how" and "why". The dynamic playlist is then created by matching the keywords used in the OIP and electronic file metadata. The order of playback could be generated randomly, or can be established by e.g. keyword frequency occurence.

6. Present files linked to the tokens by playing back the playlist.

7. The platform (10) should be continually monitored for removal of one of the tokens. If an object is removed, the above process could be gone through again to re-establish the identity of the remaining objects. This modifies the electronic file play list and playback thereof.

As a further enhancement of the system, it could incorporate a Central Data Store (CDS) which hold information about the following:
   Object Identification Profile (OIP)
   Data location information (Universal Resource Location or URL)
   Data sequence playback information
   Usage information
   Scanning device configuration profile
   Eelectronic file metadata
   Token, token identity or OIP metadata It is envisaged that in this embodiment, the identification and retrieval of electronic files linked to multiple tokens would allow the "playback" presentation sequence to be dynamically ordered. For example, one media "playback" stream relating to one of the plurality of tokens can be merged with a second or subsequent media "playback" stream to produce a hybrid media stream. Alternatively, the media streams could be dynamically generated using the metadata attached to both the OIP and individual electronic files.

In this way, the invention provides a simple and intuitive way for people to access digital media in the form of electronic files stored on disparate and multiple clients and Internet based platforms by providing a single point of access thereto. Such electronic files could include multimedia messaging service ("MMS") photos stored on a mobile operators network, photos stored on Yahoo!™ Photos.

The configurations as described above and in the drawings are for ease of description only and not meant to restrict the apparatus to a particular arrangement in use. It will be apparent to the skilled person that various sequences and permutations on the methods and apparatus described are possible within the scope of this invention as disclosed.

In particular, the invention may comprise a single unitary device, or in a preferred arrangement that measuring unit in particular could take the form of a peripheral unit to be used with a computer system. Consumer versions of the invention may work via a home personal digital video recorder (PVR) or set top box connected to a television. Alternatively the invention could comprise a bespoke set of items specific to the task.

What is claimed is:

1. A method to create within a computer system, an association between the appearance of a physical memento object which is not part of nor representative of a part of a human body and one or more stored files, said method comprising:
   measuring physical parameters of said physical memento object which is not part of nor representative of a part of a human body;
   creating a memento object identity from the obtained measurements, which memento object identity is based on consistent and repeatable measurements without requiring recognition of specific elements of the object being measured;
   storing said electronic identity in an identity store; and
   associating said one or more stored files with said memento object identity.

2. A method to create within a computer system, an association between the appearance a physical memento object which is not part of nor representative of a part of a human body and information of the location of one or more files, said method comprising:
   measuring physical parameters of said physical memento object which is not part of nor representative of a part of a human body;
   creating a memento object identity from the obtained measurements, which memento object identity is based on consistent and repeatable measurements without requiring recognition of specific elements of the object being measured; and
   storing said electronic identity in an identity store; and
   associating said memento object identity with said information of the location of one or more files.

3. A method to retrieve one or more stored files within a computer system, by use of a stored memento object identity created from measuring physical parameters of a physical memento object which is not part of nor representative of a part of a human body, where said memento object identity is associated with said one or more stored files, which memento object identity is based on consistent and repeatable measurements without requiring recognition of specific elements of the object being measured, said method comprising:
   creating a subsequent identity for said memento object by again measuring said physical parameters of said memento object which is not part of nor representative of a part of a human body;

searching for a match between said subsequent identity and said memento object identity; and upon the location of a match, retrieving said one or more stored files which are associated with said stored memento object identity.

4. A method to create within a computer system, an association between physical parameters of a physical memento object and one or more stored files for the purpose of retrieving and presenting said one or more stored files, said method comprising:

measuring physical parameters of said memento object which is not part of nor representative of a part of a human body;

creating a memento object identity from the obtained measurements, which memento object identity is based on consistent and repeatable measurements without requiring recognition of specific elements of the object being measured;

storing said memento object identity in an identity store;

associating within said computer system, said stored file with said memento object identity;

subsequently measuring said physical parameters of said memento object which is not part of nor representative of a part of a human body;

creating a subsequent identity for said memento object using subsequent measurement data obtained from said subsequent measurement;

searching in said identity store for a match with said subsequent identity;

upon the location of a match, retrieving said one or more stored files; and presenting said retrieved file to a user.

5. A method according to claim 1, wherein said parameters of said memento object comprise the size and/or shape and/or color of said memento object.

6. A method according to claim 1, wherein said memento object identity is a single object identification profile created from measurements of said parameters and one or more other physical characteristics of said memento object, which memento object is not itself imaged in any of the stored files associated therewith.

7. A method according claim 6, wherein a measurement of the weight of said memento object is used in the creation of said memento object identity.

8. A method according to claim 1, wherein measurement data of said parameters and/or one or more other physical characteristics of is prioritized in the creation of said memento object identity, by ascribing to each a value relative to each other.

9. Apparatus to create within a computer system, an association between the appearance a physical memento object and one or more stored files, said apparatus comprising:

measuring means by which physical parameters of said memento object are measured which is not part of nor representative of a part of a human body processing means to create a memento object identity from measurement data obtained by said measuring means, which memento object identity is based on consistent and repeatable measurements without requiring recognition of specific elements of the object being measured;

an identity store to store said memento object identity;

a file store to store said one or more stored files; and means to associate said memento object identity and said one or more stored files.

10. Apparatus to create within a computer system, an association between the appearance a physical memento object and information of the location of one or more files, said apparatus comprising:

measuring means by which physical parameters of said memento object are measured without measuring any part of nor anything representative of a part of a human body;

processing means to create a memento object identity from measurement data obtained by said measuring means, which memento object identity is based on consistent and repeatable measurements without requiring recognition of specific elements of the object being measured;

an identity store to store said memento object identity;

a location information store to store said file location information; and means to associate said memento object identity and said file location information.

11. Apparatus to retrieve within a computer system, one or more stored files by use of a memento object identity created from measuring physical parameters of a physical memento object, where said memento object identity is associated with said one or more stored files, said apparatus comprising:

measuring means by which physical parameters of said memento object are measured separately from any part of nor representative of a part of a human body;

means to create a subsequent identity for said memento object from measurement data obtained from said measuring means, which memento object identity is based on consistent and repeatable measurements without requiring recognition of specific elements of the object being measured;

means to search for a match for said subsequent identity with said memento object identity; and means to retrieve said one or more stored files, based on the identification of a match or a partial match between said subsequent identity and said memento object identity.

12. Apparatus to create within a computer system, an association between a physical memento object and a stored file for the purpose of retrieving and presenting said stored file, said apparatus comprising:

measuring means by which physical parameters of said memento object are measured separately from any part of nor representative of a part of a human body on the first and subsequent occasions;

processing means to create a memento object identity and a subsequent identity from measurement data obtained from said measuring means, which memento object identity is based on consistent and repeatable measurements without requiring recognition of specific elements of the object being measured;

an identity store to store said memento object identity;

a file store to store said files;

means to associate said memento object identity and said files;

searching means to find a match with said subsequent identity in said identity store;

means to retrieve files associated with said memento object identity, based on the identification of a match or a partial match between said subsequent identity and said memento object identity; and presentation means by which said retrieved files are presented to a user.

13. Apparatus according to claim 9, wherein said processing means performs the tasks of:

creating a memento object identity and/or subsequent identity;

associating said memento object identity with said one or more files;

searching to find a match with said subsequent identity; and/or retrieving said one or more stored files.

14. Apparatus according to claim 9, further including means to control the measuring environment.

15. Apparatus according to claim 14, wherein said control means is a light source.

16. Apparatus according to claim 9 taking a unitary form.

17. A method according to claim 3 to retrieve one or more stored files within a computer system associated with all of a plurality of memento objects, by use of a plurality of stored memento object identities each created from measuring physical parameters of a respective one of said plurality of physical memento objects, wherein the method is iterated for each of the plurality of said memento objects.

18. A method as in claim 1, wherein said physical memento object is a gift or found object in the possession of a user having permitted access to said stored files, said memento object being associated by said user with memories of an experience, event or special occasion such that subsequent exposure to the memento effects linkage to said memories.

* * * * *